(12) United States Patent
Ardovino

(10) Patent No.: US 10,768,426 B2
(45) Date of Patent: Sep. 8, 2020

(54) HEAD MOUNTED DISPLAY SYSTEM RECEIVING THREE-DIMENSIONAL PUSH NOTIFICATION

(71) Applicant: Microsoft Technology Licensing, LLC, Redmond, WA (US)

(72) Inventor: Anthony Joseph Ardovino, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/985,612

(22) Filed: May 21, 2018

(65) Prior Publication Data
US 2019/0353904 A1    Nov. 21, 2019

(51) Int. Cl.
*G02B 27/01* (2006.01)
*G06F 3/0481* (2013.01)
*G06K 9/00* (2006.01)

(52) U.S. Cl.
CPC ..... *G02B 27/0172* (2013.01); *G06F 3/04815* (2013.01); *G06K 9/00671* (2013.01); *G02B 2027/0178* (2013.01)

(58) Field of Classification Search
CPC .............. G02B 27/017; G02B 27/0172; G02B 2027/0174; G02B 2027/0178; G02B 2027/0181; G06F 3/04815; G06K 9/00671
USPC ........................................................ 345/7–9
See application file for complete search history.

(56) References Cited

U.S. PATENT DOCUMENTS

| 8,910,081 | B2 | 12/2014 | Fennel |
| 9,761,057 | B2 | 9/2017 | Salter et al. |
| 2008/0141175 | A1 | 6/2008 | Sarna et al. |
| 2011/0187709 | A1 | 8/2011 | Lee et al. |
| 2012/0081356 | A1 | 4/2012 | Filippov et al. |
| 2014/0002444 | A1 | 1/2014 | Bennett et al. |
| 2014/0361988 | A1 | 12/2014 | Katz et al. |
| 2016/0048211 | A1* | 2/2016 | Raffle ............. G06F 3/017 715/863 |

(Continued)

OTHER PUBLICATIONS

"International Search Report and Written Opinion Issued in PCT Application No. PCT/US19/030800", dated Jul. 26, 2019, 12 Pages.

*Primary Examiner* — Alexander Eisen
*Assistant Examiner* — Nelson Lam
(74) *Attorney, Agent, or Firm* — Alleman Hall Creasman & Tuttle LLP

(57) ABSTRACT

A head-mounted display system is provided, including a head-mounted display configured to display one or more virtual objects in a physical environment. The head-mounted display system may further include a processor configured to receive a three-dimensional push notification at an application program via an application program interface (API) of one or more APIs included in a volumetric operating system. The three-dimensional push notification may indicate a first location in the physical environment of an application program virtual object included in the one or more virtual objects. The application program virtual object may be associated with the application program. The processor may generate a three-dimensional push notification virtual object based on the three-dimensional push notification. The processor may output the three-dimensional push notification virtual object for display on the head-mounted display at a second location relative to the first location in the physical environment.

20 Claims, 11 Drawing Sheets

(56) References Cited

U.S. PATENT DOCUMENTS

| | | | |
|---|---|---|---|
| 2016/0050307 A1 | 2/2016 | Yan et al. | |
| 2016/0063766 A1* | 3/2016 | Han | G02B 27/017 |
| | | | 345/633 |
| 2016/0212538 A1* | 7/2016 | Fullam | G06K 9/0057 |
| 2016/0357399 A1 | 12/2016 | Shin et al. | |
| 2016/0379409 A1* | 12/2016 | Gavriliuc | G06T 19/006 |
| | | | 345/8 |
| 2017/0169610 A1* | 6/2017 | King | G02B 27/017 |
| 2017/0192620 A1 | 7/2017 | Kim et al. | |
| 2017/0214782 A1* | 7/2017 | Brinda | G06F 3/012 |
| 2017/0301142 A1* | 10/2017 | Gentilin | H04L 67/34 |
| 2017/0337897 A1* | 11/2017 | Jung | G06F 3/012 |
| 2017/0354845 A1 | 12/2017 | Williams et al. | |
| 2018/0113669 A1* | 4/2018 | Szeto | G06F 3/011 |
| 2018/0246326 A1* | 8/2018 | Moon | G02B 27/0172 |
| 2019/0304406 A1* | 10/2019 | Griswold | G06F 3/011 |
| 2020/0019781 A1* | 1/2020 | Smith | G06F 3/013 |
| 2020/0042098 A1* | 2/2020 | Joo | G02B 27/017 |

* cited by examiner

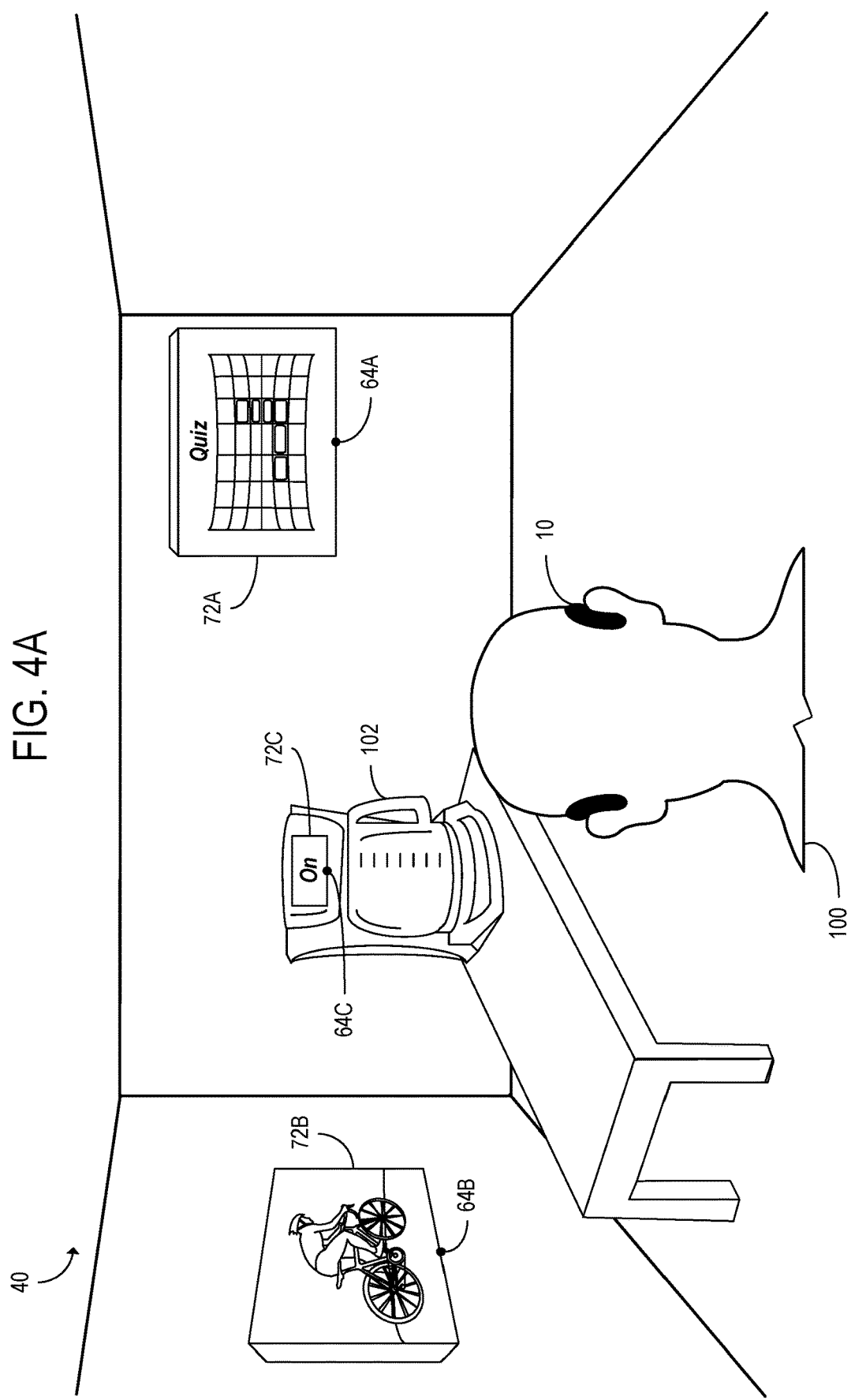

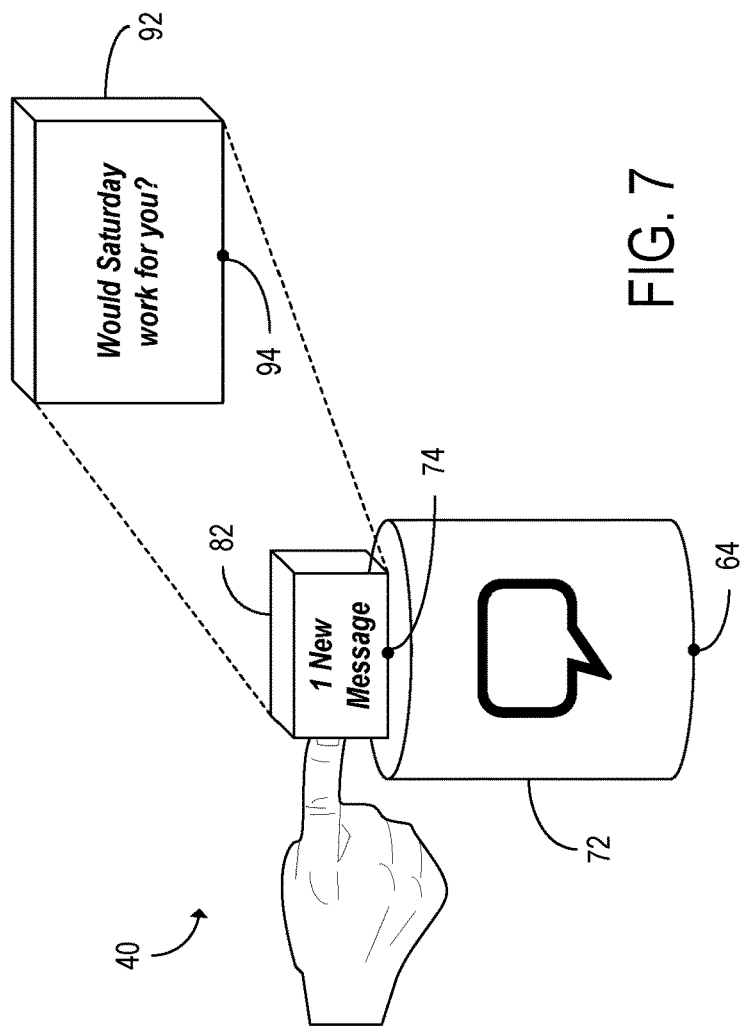
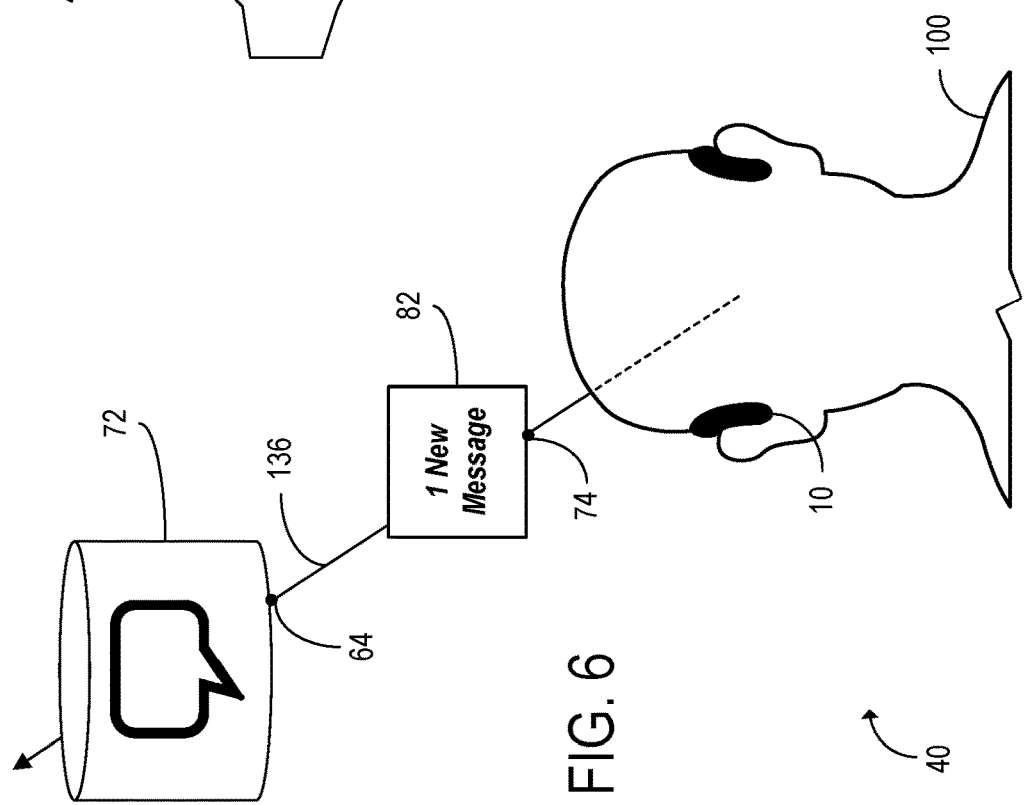
FIG. 7
FIG. 6

HEAD MOUNTED DISPLAY SYSTEM RECEIVING THREE-DIMENSIONAL PUSH NOTIFICATION

BACKGROUND

In modern server-client computing systems, most communications are sent using a request and response model, in which a client program sends a request to a server program and the server program responds. In such a model the server program is always running, listening for requests from clients, while the client program may be intermittently executed according to the needs of a user. In the specific context of augmented reality and virtual reality systems, updating virtual objects associated with augmented reality and virtual reality application programs executed on a client device typically requires those application programs to remain open and running. However, leaving application programs open may unnecessarily consume computing resources. In particular, for portable client devices that operate on battery power, this can cause the battery to deplete more quickly. For this reason, users may prefer to close the application programs when not actively used. When the applications are closed, they are not available to make requests of remote servers that may contain updated information to be downloaded. If the virtual objects associated with the application programs are not updated because the application programs are closed, users may be unaware of events related to those application programs.

SUMMARY

According to one aspect of the present disclosure, a head-mounted display system is provided, including a head-mounted display configured to display one or more virtual objects in a physical environment. The head-mounted display system may further include a processor configured to receive a three-dimensional push notification at an application program via an application program interface (API) of one or more APIs included in a volumetric operating system. The three-dimensional push notification may indicate a first location in the physical environment of an application program virtual object included in the one or more virtual objects. The application program virtual object may be associated with the application program. The processor may be further configured to generate a three-dimensional push notification virtual object based on the three-dimensional push notification. The processor may be further configured to output the three-dimensional push notification virtual object for display on the head-mounted display at a second location relative to the first location in the physical environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A shows an example physical environment in which a head-mounted display device worn by a user is situated, according to the embodiment of FIG. 1.

FIG. 6 shows a three-dimensional push notification displayed based at least in part on a display location of a head-mounted display device in a physical environment, according to the embodiment of FIG. 1.

FIG. 7 shows an example physical environment in which an interaction input occurs, according to the embodiment of FIG. 1.

DETAILED DESCRIPTION

Figure 1:
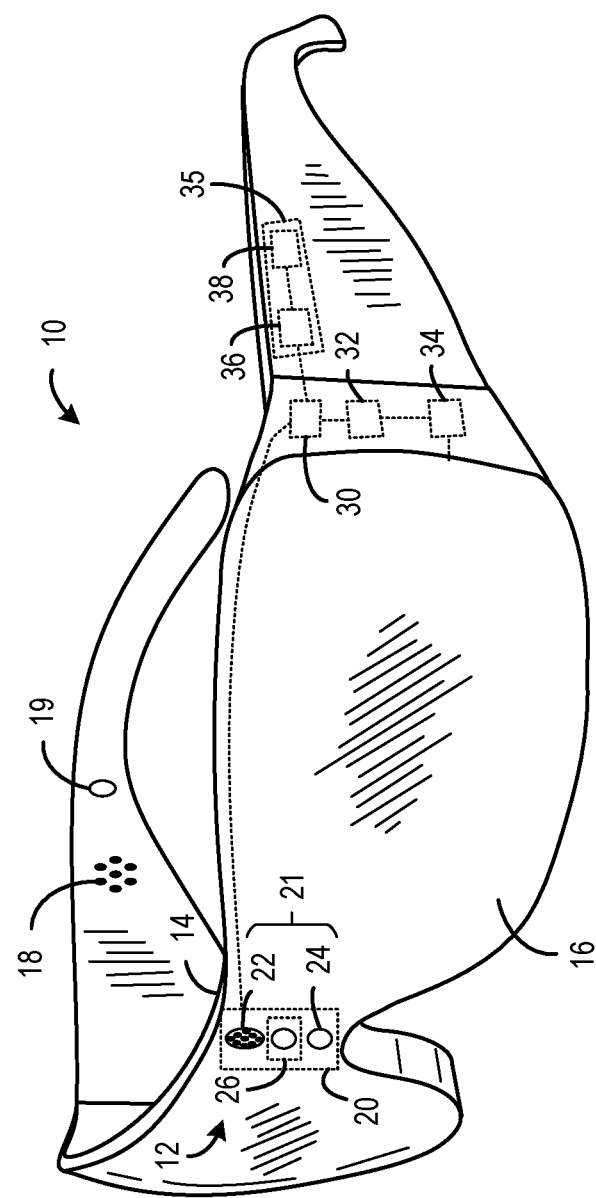
FIG. 1 shows an example head-mounted display system in the form of a head-mounted display device, according to one embodiment of the present disclosure.

In order to address the problems discussed above, a head-mounted display system is provided. FIG. 1 illustrates an example head-mounted display system in the form of a head-mounted display device 10. The head-mounted display device 10 may include an on-board computing system, including a processor 30, a volatile storage device 32, and/or a non-volatile storage device 34. Although FIG. 1 only shows a head-mounted display device 10, the head-mounted display system may further include an off-board computing system 110 including one or more off-board computing devices 112 configured to communicate with the head-mounted display device 10, as shown in FIG. 2.

Figure 2:
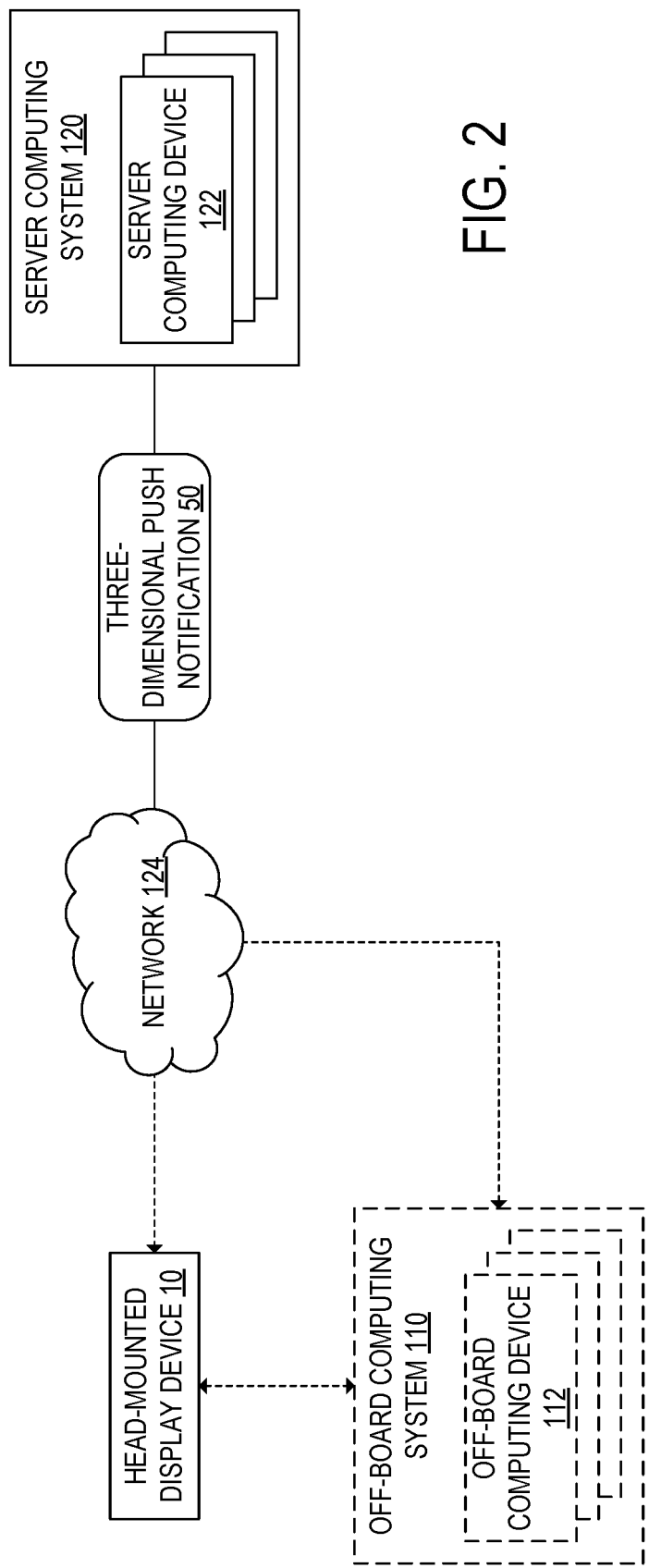
FIG. 2 shows communication between a head-mounted display device, an off-board computing system, and/or a server computing system, according to the embodiment of FIG. 1.

FIG. 2 shows communication between the head-mounted display device 10, the off-board computing system 110, and/or a server computing system 120, according to one example embodiment. The server computing system 120 may include one or more server computing devices 122 configured to communicate with the head-mounted display device 10 via a network 124. The server computing system 120 may be configured to transmit a three-dimensional push notification 50 to the head-mounted display device 10 over the network 124, as discussed below with reference to FIG. 3. The head-mounted display device 10 may be further configured to communicate with an off-board computing system 110 including one or more off-board computing devices 112. In such embodiments, the off-board computing system 110 may be configured to communicate with the server computing system 120 over the network 124. The off-board computing system 110 may be configured to receive the three-dimensional push notification 50 from the server computing system 120 via the network.

Returning to FIG. 1, the illustrated head-mounted display device 10 takes the form of wearable glasses or goggles, but it will be appreciated that other forms are possible. The head-mounted display device 10 may include an output device suite 14 including a display 16. In some embodiments, the head-mounted display device 10 may be configured in an augmented reality configuration to present an augmented reality environment, and thus the display 16 may be an at least partially see-through stereoscopic display configured to visually augment an appearance of a physical environment being viewed by the user through the display 16. In some examples, the display 16 may include one or more regions that are transparent (e.g. optically clear) and may include one or more regions that are opaque or semi-transparent. In other examples, the display 16 may be transparent (e.g. optically clear) across an entire usable display surface of the display 16.

Alternatively, the head-mounted display device 10 may be configured in a virtual reality configuration to present a full virtual reality environment, and thus the display 16 may be a non-see-though stereoscopic display. The head-mounted display device 10 may be configured to display virtual three-dimensional environments to the user via the non-see-through stereoscopic display. The head-mounted display device 10 may be configured to display a virtual representation such as a three-dimensional graphical rendering of the physical environment in front of the user that may include additional virtual objects. Displaying the virtual representation of the physical environment may include generating a two-dimensional projection of a three-dimensional model of the physical environment onto the surface of the display 16.

The output device suite 14 of the head-mounted display device 10 may, for example, include an image production system that is configured to display virtual objects to the user with the display 16. In the augmented reality configuration with an at least partially see-through display, the virtual objects are visually superimposed onto the physical environment that is visible through the display 16 so as to be perceived at various depths and locations. In the virtual reality configuration, the image production system may be configured to display virtual objects to the user with a non-see-through stereoscopic display, such that the virtual objects are perceived to be at various depths and locations relative to one another. In one embodiment, the head-mounted display device 10 may use stereoscopy to visually place a virtual object at a desired depth by displaying separate images of the virtual object to both of the user's eyes. Using this stereoscopy technique, the head-mounted display device 10 may control the displayed images of the virtual objects, such that the user will perceive that the virtual objects exist at a desired depth and location in the viewed physical environment.

The output device suite 14 of the head-mounted display device 10 may further include one or more speakers 18 configured to emit sound. In some embodiments, the head-mounted display device 10 may include at least a left speaker and a right speaker situated such that the left speaker may be located proximate the user's left ear and the right speaker may be located proximate the user's right ear when the head-mounted display device 10 is worn. Thus, the one or more speakers 18 may emit stereo sound output. The output device suite 14 may further include one or more haptic feedback devices 19 configured to provide tactile output (e.g. vibration).

The head-mounted display device 10 may include an input device suite 12, including one or more input devices. The input devices may include one or more optical sensors and one or more position sensors, which are discussed in further detail below. Additionally or alternatively, the input devices may include user input devices such as one or more buttons, control sticks, microphones, touch-sensitive input devices, or other types of input devices.

The input device suite 12 of the head-mounted display device 10 may include one or more imaging sensors 21. In one example, the input device suite 12 includes an outward-facing optical sensor 22 that may be configured to detect the real-world background from a similar vantage point (e.g., line of sight) as observed by the user through the display 16 in an augmented reality configuration. The input device suite 12 may additionally include an inward-facing optical sensor 24 that may be configured to detect a gaze direction of the user's eyes. It will be appreciated that the outward facing optical sensor 22 and/or the inward-facing optical sensor 24 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired.

The input device suite 12 of the head-mounted display device 10 may further include a position sensor system 26 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the one or more imaging sensors 21 and/or position sensor information received from position sensors may be used to assess a position and orientation of the vantage point of head-mounted display device 10 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined by the on-board computing system and/or the off-board computing system 110.

Furthermore, the optical sensor information and the position sensor information may be used by the head-mounted display system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world. The virtual model is a three-dimensional model and may be referred to as "world space," and may be contrasted with the projection of world space viewable on the display 16, which is referred to as "screen space." Additionally, the optical sensor information received from the one or more imaging sensors 21 may be used to identify and track objects in the field of view of the one or more imaging sensors 21. The optical sensors may also be used to identify machine recognizable visual features in the physical environment and use the relative movement of those features in successive frames to compute a frame to frame relative pose change for the head mounted display device 10 within the world space of the virtual model.

The head-mounted display device 10 may further include a communication system 35 including one or more communication devices, which may include one or more receivers 36 and/or one or more transmitters 38. In embodiments in which the head-mounted display device 10 communicates with an off-board computing system 110, the one or more receivers 36 may be configured to receive data from the off-board computing system 110, and the one or more transmitters 38 may be configured to send data to the off-board computing system 110. In some embodiments, the head-mounted display device 10 may communicate with the off-board computing system 110 via a network 124, which may be a wireless local- or wide-area network. Additionally or alternatively, the head-mounted display device 10 may communicate with the off-board computing system 110 via a wired connection. The head-mounted display device 10 may be further configured to communicate with a server computing system 120 via the communication system 35.

Figure 3:
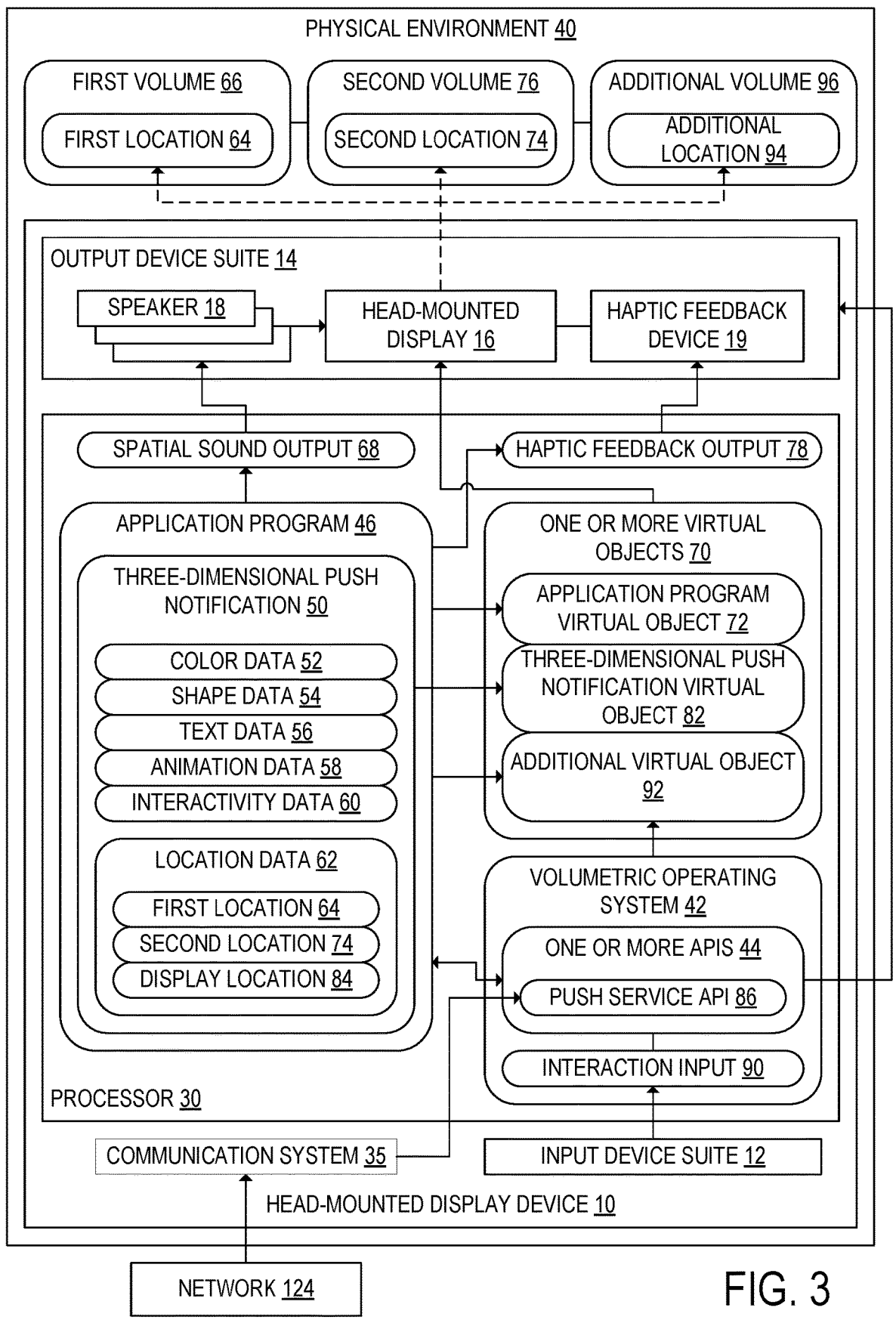
FIG. 3 shows a head-mounted display device situated in a physical environment, according to the embodiment of FIG. 1.

FIG. 3 schematically shows the head-mounted display device 10 of FIG. 1 situated in a physical environment 40. The display 16 of the head-mounted display device 10 may be configured to display one or more virtual objects 70 in the physical environment 40. The one or more virtual objects 70 displayed in the physical environment may include an application program virtual object 72 associated with an application program 46 executed by the processor 30 of the head-mounted display device 10. The application program virtual object 72 may be displayed at a first location 64 in the physical environment 40. In some embodiments, the application program virtual object 72 may occupy a first volume 66 of space in the physical environment 40, which may include the first location 64.

The processor 30 of the head-mounted display device 10 may be configured to execute a volumetric operating system 42, which may include one or more application program interfaces (APIs) 44. The one or more APIs may be configured to receive data from, and/or output data to, the application program 46. The one or more APIs 44 may be further configured to receive data from the one or more input devices included in the input device suite 12 and/or output data to the one or more output devices included in the output device suite 14. The one or more APIs may additionally or alternatively receive data from, or output data to, the communication system 35. Thus, the one or more APIs 44 may allow the application program 46 to interact with the one or more input devices, one or more output devices, and/or one or more communication devices included in the head-mounted display device 10.

The processor 30 may be further configured to receive a three-dimensional push notification 50 at the application program 46 via an API 44 of the one or more APIs 44 included in the volumetric operating system 42. The API 44 with which the processor 30 may receive the three-dimensional push notification 50 may be a push service API 86 configured to receive the three-dimensional push notification 50 from the communication system 35. The three-dimensional push notification 50 may include three-dimensional push notification data, which may include color data 52, shape data 54, text data 56, animation data 58, interactivity data 60, and location data 62. Other three-dimensional push notification data may additionally or alternatively be included in the three-dimensional push notification 50. The processor 30 may be further configured to generate a three-dimensional push notification virtual object 82 based on the three-dimensional push notification 50.

The three-dimensional push notification data may specify properties of the three-dimensional push notification virtual object 82. The shape data 54 may specify one or more shapes included in the three-dimensional push notification virtual object 82. In some embodiments, the three-dimensional push notification virtual object may include one or more polygons, for example defining a three-dimensional mesh that can be displayed as a virtual object such as a hologram, indicated by the shape data 54. The color data 52 may indicate at least one color with which the three-dimensional push notification virtual object 82 is shaded. For example, when the shape data 54 specifies one or more polygons included in the three-dimensional push notification virtual object 82, the color data 52 may indicate a respective color with which each polygon is shaded. Respective textures and/or meshes may be applied to the one or more polygons. Of course, it will be appreciated that the shape data may include a definition of shapes represented other than by three dimensional meshes of polygons. In embodiments in which the three-dimensional push notification virtual object 82 includes text, the text included in the three-dimensional push notification virtual object 82 may be specified by the text data 56. The text data 56 may further specify properties of the text such as font, size, and/or color. In embodiments in which the three-dimensional push notification virtual object 82 is animated, the animation data 58 may specify one or more frames that may be displayed to animate the three-dimensional push notification virtual object 82. The animation may be three-dimensional, for example, and may be a virtual object such as a hologram.

The processor 30 may be further configured to output the three-dimensional push notification virtual object 82 for display on the head-mounted display 16. The three-dimensional push notification virtual object 82 may be displayed at a second location 74 relative to the first location 64 in the physical environment 40. The three-dimensional push notification virtual object 82 may occupy a second volume 76 of space in the physical environment 40, which may include the second location 74. The second location 74 may be included in the location data 62 of the three-dimensional push notification virtual object 82. The location data 62 may further include the first location 64 of the application program virtual object 72. In some embodiments, the location data 62 may further include a display location 84 of the head-mounted display device 10 in the physical environment 40. In such embodiments, the three-dimensional push notification virtual object 82 may be displayed based at least in part on the display location 84, as discussed below with reference to FIGS. 5-6.

In embodiments in which the head-mounted display device 10 includes a plurality of speakers 18, the processor 30 may be further configured to generate a spatial sound output 68 localized at the first location 64. The processor 30 may be further configured to output the spatial sound output 68 to the plurality of speakers 18. The spatial sound output 68 may be output to the plurality of speakers 18 when the three-dimensional push notification virtual object 82 is output to the head-mounted display 16. Thus, the three-dimensional push notification virtual object 82 and spatial sound output 68 may both draw a user's attention toward the application program virtual object 72 displayed at the first location 64.

Additionally or alternatively, in embodiments in which the head-mounted display device 10 includes a haptic feedback device 19, the processor 30 may be further configured to generate a haptic feedback output 78 that indicates a direction toward the first location 64. For example, the haptic feedback output 78 may be a vibration at a side of the user's head positioned toward the first location 64. The processor 30 may be further configured to output the haptic feedback output 78 to the haptic feedback device 19.

Figure 4B:
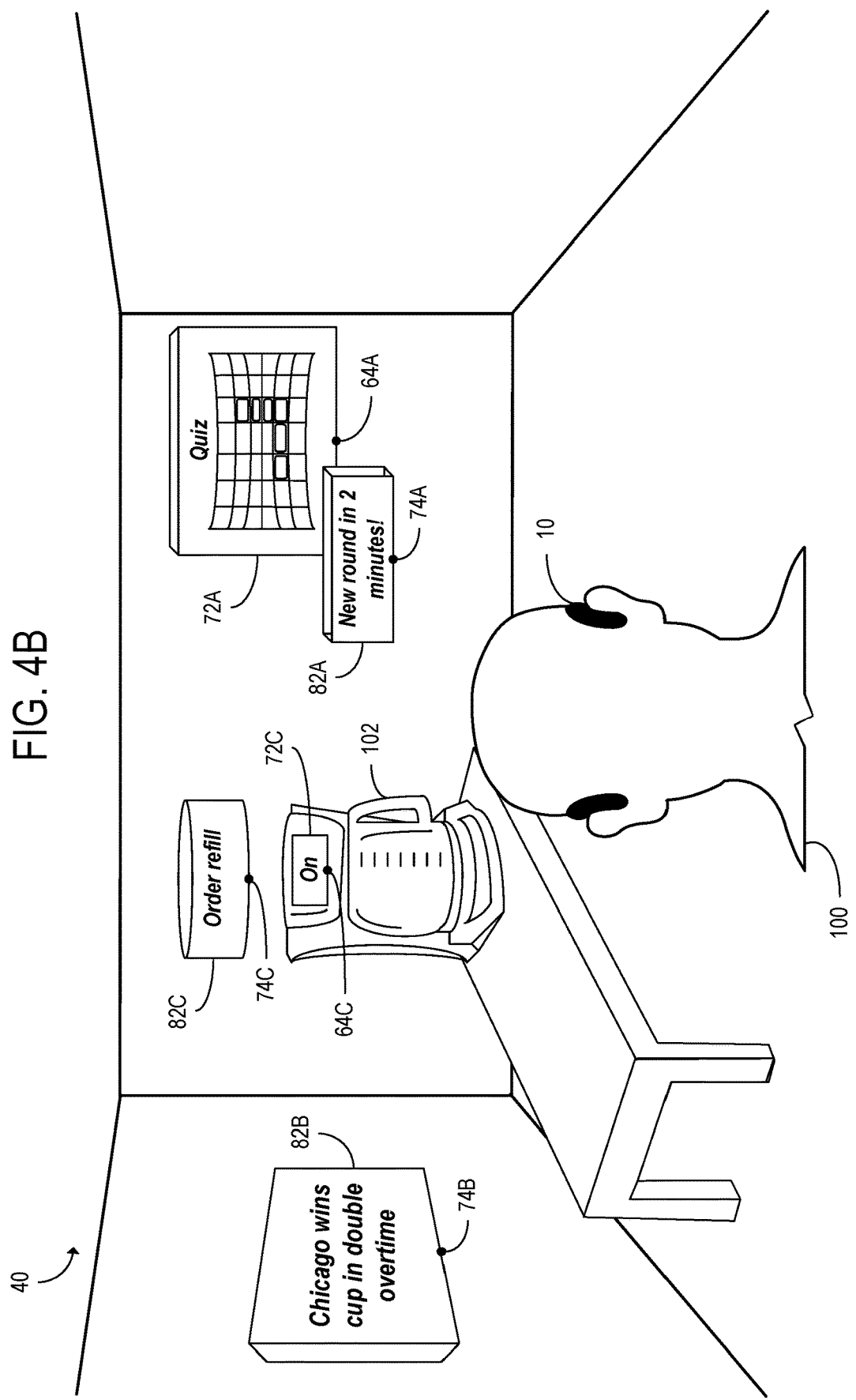
FIG. 4B shows the example physical environment of FIG. 4A, in which a plurality of three-dimensional push notification virtual objects are displayed.

FIG. 4A shows an example physical environment 40 in which a user 100 wearing the head-mounted display device 10 of FIG. 1 is situated. A first application program virtual object 72A, which is associated with a quiz game application program, and a second application program virtual object 72B, which is associated with a sports application program, are displayed at quiz game first location 64A and sports first location 64B respective. The physical environment 40 further includes a coffee maker 102. A third application program virtual object 72C, which is associated with the coffee maker 102, is displayed at a coffee maker first location 64C. The coffee maker first location 64C is an anchor location world-locked to a surface of a physical object in the physical environment 40. In the example of FIGS. 4A-B, the physical object is the coffee maker 102.

FIG. 4B shows the example physical environment 40 of FIG. 4A when three-dimensional push notification virtual objects 82A, 82B, and 82C are displayed. The three-dimensional push notification virtual objects 82A, 82B, and 82C are displayed at second locations 74A, 74B, and 74C respectively, and are respectively associated with the quiz game application program, the sports application program, and the coffee maker application program. As shown in FIG. 4B, the quiz game three-dimensional push notification virtual object 82A is displayed on a surface of the quiz game application program virtual object 72A. In contrast, the sports three-dimensional push notification virtual object 82B is configured to replace the sports application program virtual object 72B. The coffee maker second location 74C at which the coffee maker three-dimensional push notification virtual object 82C is displayed is a world-locked location in the physical environment 40. While the coffee maker first location 64C is shown as an anchor location world-locked to the surface of a physical object in FIGS. 4A-B, the second location 74 may additionally or alternatively be world-locked to the surface of the physical object in other embodiments.

Figure 5A:
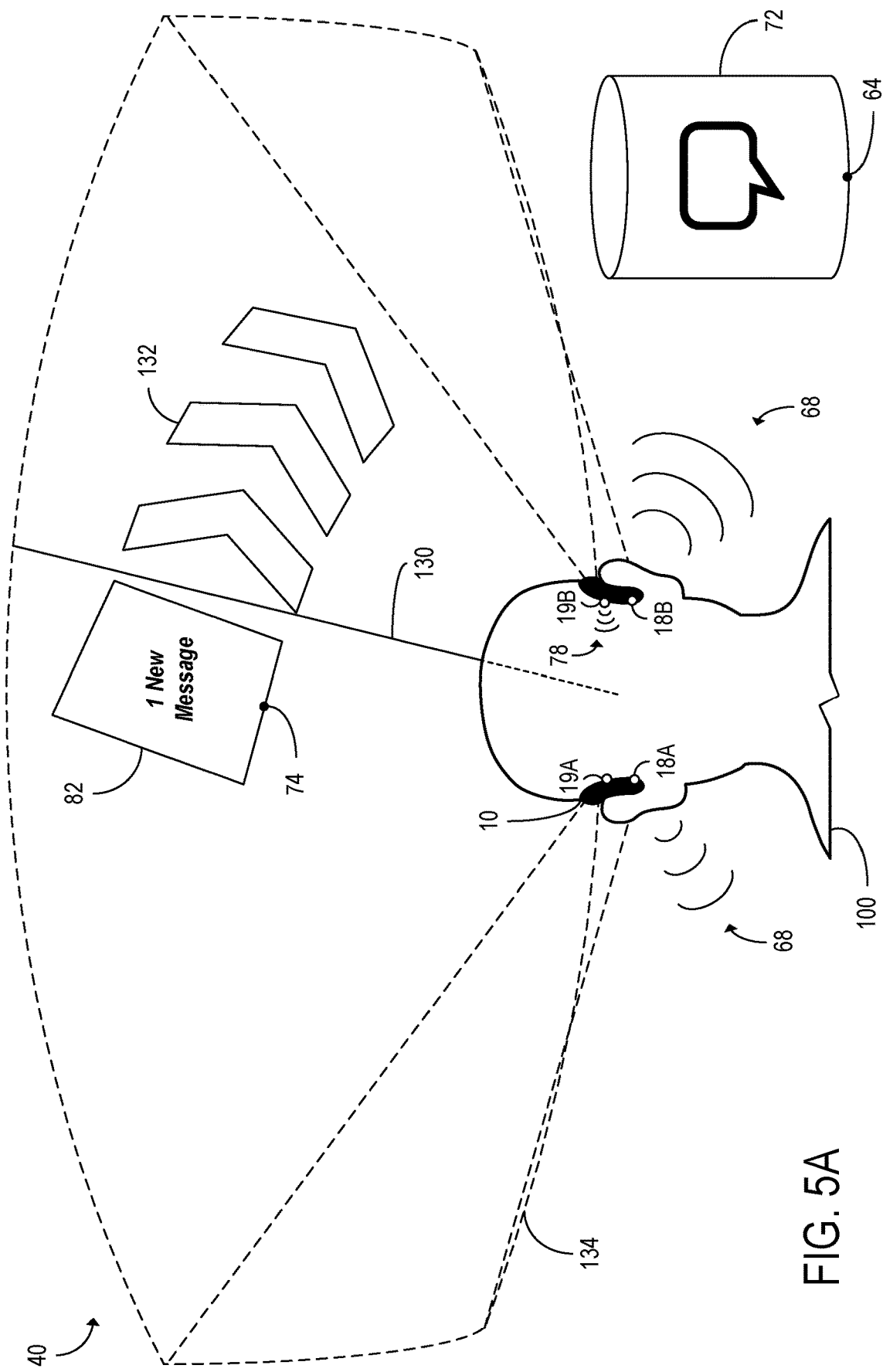
FIG. 5A shows an example field of view of a user wearing a head-mounted display device, according to the embodiment of FIG. 1.
Figure 5B:
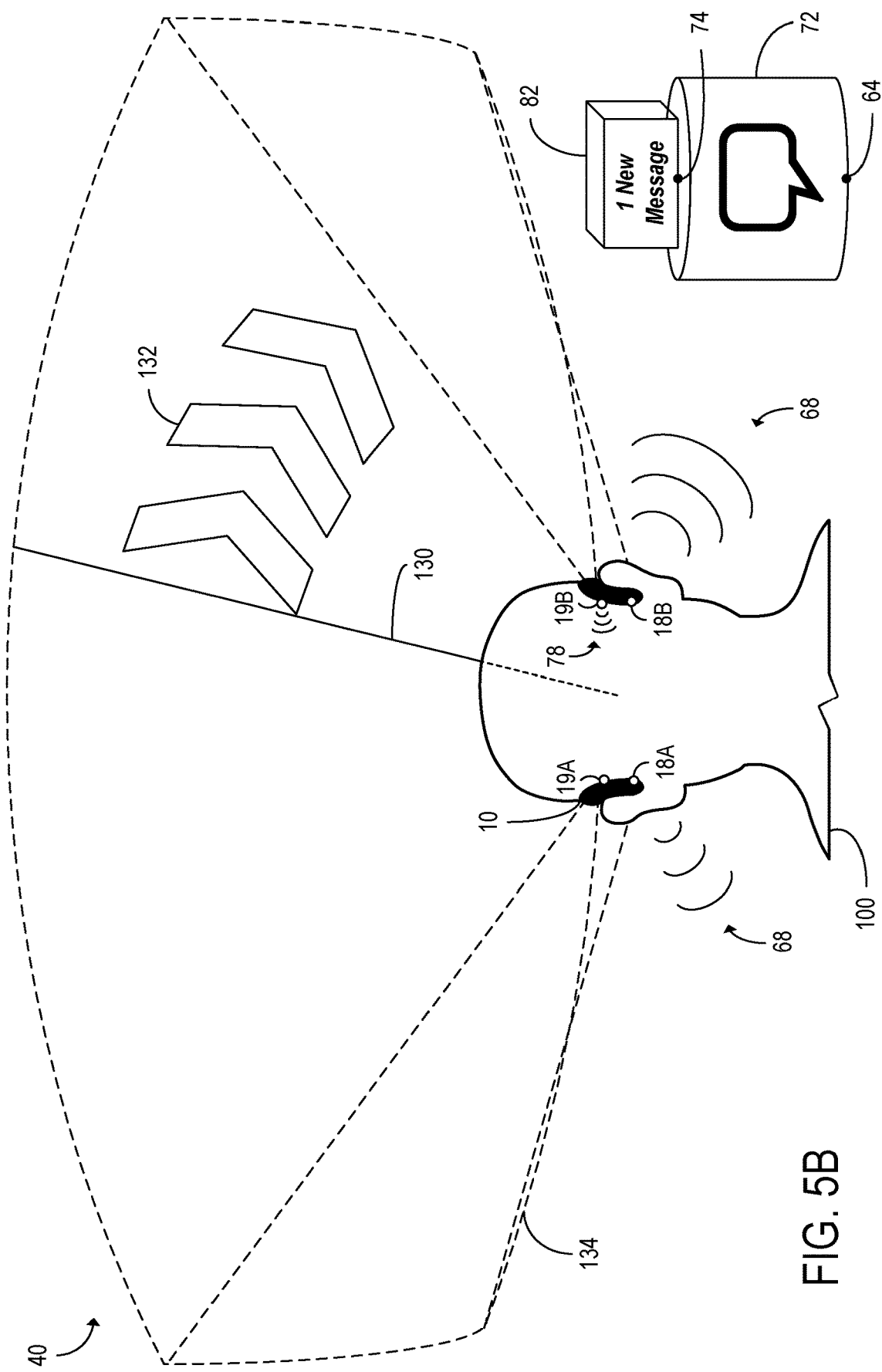
FIG. 5B shows another example field of view of a user wearing a head-mounted display device, according to the embodiment of FIG. 1.

FIGS. 5A and 5B show example embodiments in which the head-mounted display device 10 includes an inward-facing optical sensor 24 configured to detect a gaze direction 130 of the user 100, as described above with reference to FIG. 1. The processor 30 may be further configured to determine a field of view 134 of the user 100 based on the gaze direction 130. The field of view 134 may additionally be determined based on data captured by the outward-facing optical sensor 22 of the head-mounted display device 10. As shown in the example of FIG. 5A, the first location 64 of the application program virtual object 72 is outside the detected field of view 134. However, the second location 74 of the three-dimensional push notification virtual object 82 is inside the detected field of view 134. The three-dimensional push notification virtual object 82 may be displayed based at least in part on the field of view 134. In some embodiments, the processor 30 may determine that the first location 64 is outside the detected field of view 134 and may determine the second location 74 of the three-dimensional push notification virtual object 82 based at least in part on this determination. Additionally or alternatively, the color data 52, shape data 54, text data 56, animation data 58, and/or interactivity data 60 of the three-dimensional push notification virtual object 82 may be determined based at least in part on the detected field of view 134. As shown in FIG. 5A, the three-dimensional push notification virtual object 82 includes an animated icon 132 that points toward the first location 64 of the application program virtual object 72. The animated icon 132 may be displayed, for example, based on the determination that the first location 64 is outside the detected field of view 134.

The head-mounted display device 10 as shown in FIG. 5A further includes a plurality of speakers 18 configured to output a spatial sound output 68 localized at the first location 64. Localization of the spatial sound output 68 at the first location 64 is indicated in FIG. 5A by a higher volume of sound emitted by a right speaker 18B compared to a left speaker 18A. Thus, the spatial sound output 68 seems to be located to the right of the user 100 at the first location 64 of the application program virtual object 72. Although the plurality of speakers 18 shown in FIG. 5A are on-board speakers, the head-mounted display device 10 may, in some embodiments, communicate the spatial sound output 68 to a plurality of off-board speakers via the communication system 35.

Additionally or alternatively, a haptic feedback output 78 may be localized similarly to the spatial sound output 68 in a direction toward the first location 64 in embodiments in which the head-mounted display device 10 includes a haptic feedback device 19. In the example of FIG. 5A, when the application program virtual object 72 is located to the right the user 100, the haptic feedback output 78 is output by a right haptic feedback device 19B instead of a left haptic feedback device 19A.

In FIG. 5B, the second position 74 of the three-dimensional push notification virtual object 82 is located outside the detected field of view 134 of the user 100. The second location 74, as shown in FIG. 5B, is located on the surface of the application program virtual object 72. However, the animated icon 132 is displayed within the detected field of view 134. Thus, the animated icon 132 may direct the user's gaze toward both the application program virtual object 72 and the rest of the three-dimensional push notification virtual object 82.

FIG. 6 shows an example embodiment in which the three-dimensional push notification virtual object 82 is displayed based at least in part on the display location 84 of the head-mounted display device 10 in the physical environment 40. In the embodiment of FIG. 6, the three-dimensional push notification virtual object 82 is displayed along a direction 136 from the display location 84 to the first location 64. The second location 74 may be located along the direction 136. The three-dimensional push notification virtual object 82 may be rotated and/or translated in response to movement of the head-mounted display device 10 through the physical environment. In some embodiments, the color data 52, shape data 54, text data 56, animation data 58, and/or interactivity data 60 of the three-dimensional push notification virtual object 82 may additionally or alternatively be determined based at least in part on the display location 84.

Returning to FIG. 3, in some embodiments, the volumetric operating system 42 may be configured to receive an interaction input 90 from at least one input device included in the input device suite 12 of the head-mounted display device 10. Based on the interaction input 90, the processor

30 may be further configured to generate at least one additional virtual object 92. The at least one additional virtual object 92 may, for example, display additional information related to the application program 46 with which the three-dimensional push notification 50 is associated. The at least one additional virtual object 92 may be generated based at least in part of the interactivity data 60 included in the three-dimensional push notification data, which may specify how the processor 30 responds to one or more types of interaction input 90 interacting with the three-dimensional push notification virtual object 82. The processor 30 may be further configured to output the at least one additional virtual object 92 for display on the head-mounted display 16. The additional virtual object 92 may be located at an additional location 94 and may occupy an additional volume 96 of space in the physical environment 40.

Referring to FIG. 7, an example embodiment in which the processor 30 receives an interaction input 90 is shown. As depicted in FIG. 7, the application program virtual object 72 occupies a first volume 66 of space in the physical environment 40 and the three-dimensional push notification virtual object 82 occupies a second volume 76 of space in the physical environment 40. In the embodiment of FIG. 7, the interaction input 90 includes an interaction, depicted here as a touch interaction, with the application program virtual object 72 within the first volume 66 of space. In other embodiments, the interaction input 90 may include an interaction with the three-dimensional push notification virtual object 82 within the second volume of space 76.

The at least one additional virtual object 92 may additionally or alternatively be generated in response to other type of interaction input 90. For example, the interaction input 90 may be a voice command. The interaction input 90 may alternatively be a gesture performed at a location other than the first volume 66 or second volume 76 of space.

Figure 8A:
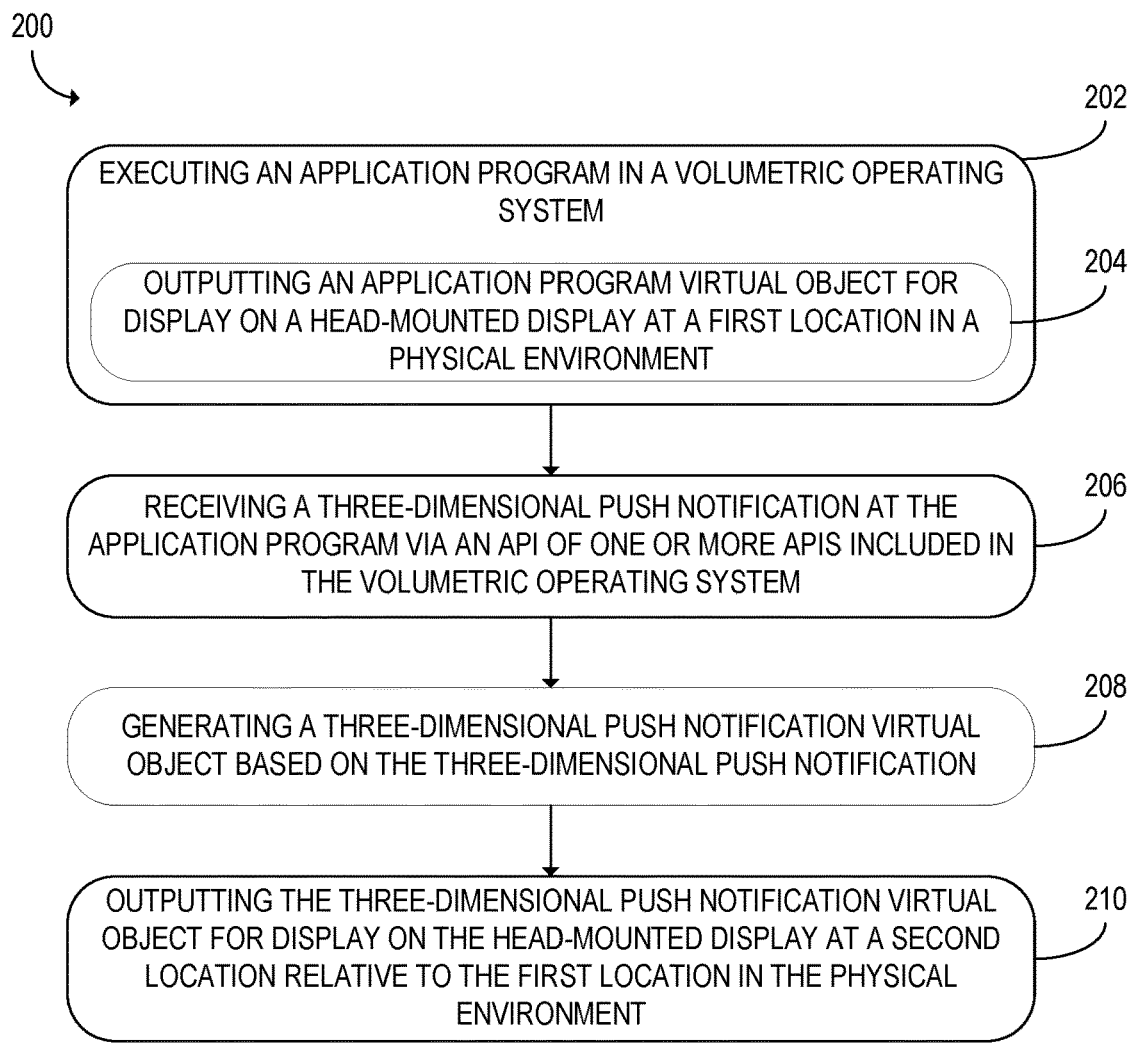
FIG. 8A shows a flowchart of an example method for use with a head-mounted display system, according to the embodiment of FIG. 1.

FIG. 8A shows a flowchart of an example method 200 for use with a head-mounted display system. The head-mounted display system may include the head-mounted display device 10 of FIG. 1. At step 202, the method 200 may include executing an application program in a volumetric operating system. Executing the application program may include, at step 204, outputting an application program virtual object for display on a head-mounted display at a first location in a physical environment. For example, the first location may be a world-locked anchor location in the physical environment. The application program virtual object may be output for display on the head-mounted display by a processor of the head-mounted display system via an API of one or more APIs included in the volumetric operating system. In some embodiments, the application program virtual object may occupy a first volume of space.

At step 206, the method 200 may further include receiving a three-dimensional push notification at the application program via an API of one or more APIs included in the volumetric operating system. The three-dimensional push notification may include three-dimensional push notification data, which may specify one or more properties of a three-dimensional push notification virtual object. The three-dimensional push notification data may be selected from the group consisting of color data, shape data, text data, animation data, interactivity data, and location data of the three-dimensional push notification virtual object.

At step 208, the method 200 may further include generating a three-dimensional push notification virtual object based on the three-dimensional push notification. The three-dimensional push notification virtual object may be generated based on the three-dimensional push notification data. In some embodiments, the three-dimensional push notification virtual object may be generated based at least in part on a display location of the head-mounted display in the physical environment. At step 210, the method 200 may further include outputting the three-dimensional push notification virtual object for display on the head-mounted display at a second location relative to the first location in the physical environment. The three-dimensional push notification virtual object may occupy a second volume of space. In some embodiments, the second location may be a world-locked location in the physical environment.

Figure 8B:
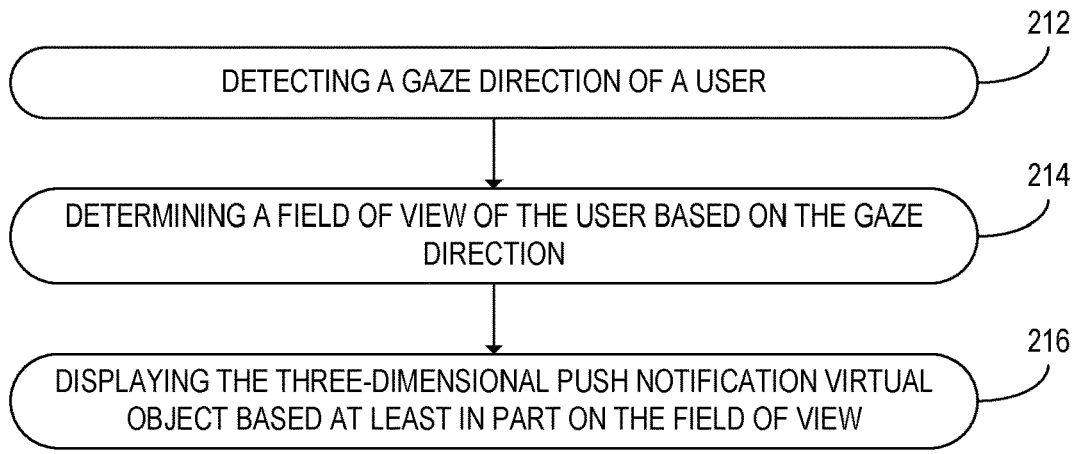
FIGS. 8B-E show additional steps that may optionally be performed as part of the method of FIG. 8A.

FIGS. 8B-E show additional steps that may optionally be performed as part of the method 200 of FIG. 8A. At step 212, as shown in FIG. 8B, the method 200 may further include detecting a gaze direction of a user. The gaze direction may be detected using an inward-facing optical sensor. At step 214, the method 200 may further include determining a field of view of the user based on the gaze direction. The field of view may additionally be determined based on data captured by an outward-facing optical sensor. At step 216, the method 200 may further include displaying the three-dimensional push notification virtual object based at least in part on the field of view. For example, the three-dimensional push notification virtual object may be displayed such that the three-dimensional push notification virtual object is located at least partially within the field of view of the user.

Figure 8C:
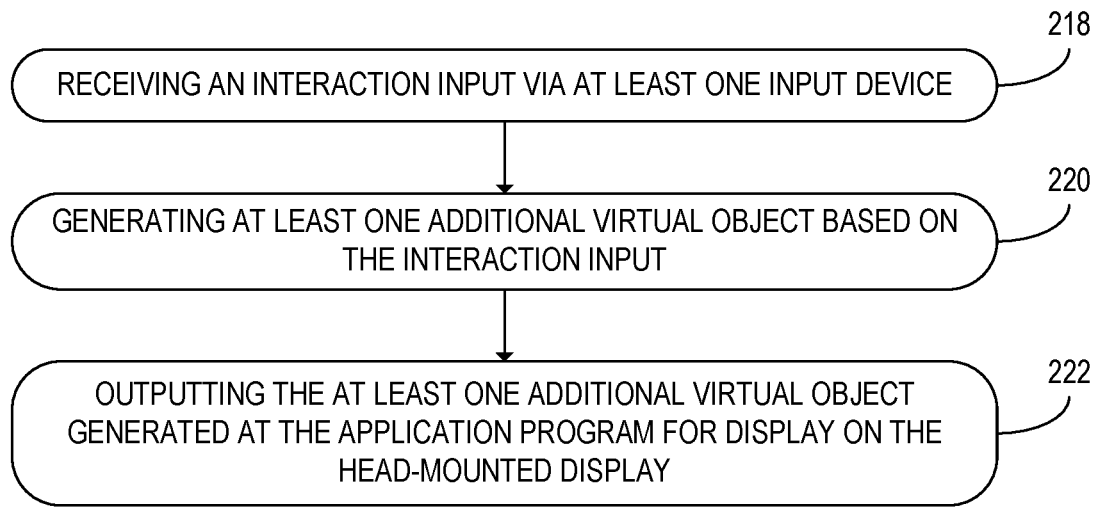

As shown in FIG. 8C, the method 200 may further include, at step 218, receiving an interaction input via at least one input device. In some embodiments, the interaction input may include a gesture performed at least partially within the first volume of the application program virtual object and/or the second volume of the three-dimensional push notification virtual object. At step 220, the method 200 may further include generating at least one additional virtual object based on the interaction input. The method 200 may further include, at step 222, outputting the at least one additional virtual object for display on the head-mounted display. The at least one additional virtual object may occupy an additional volume of space in the physical environment. In some embodiments, a plurality of additional virtual objects are generated and output.

Figure 8D:
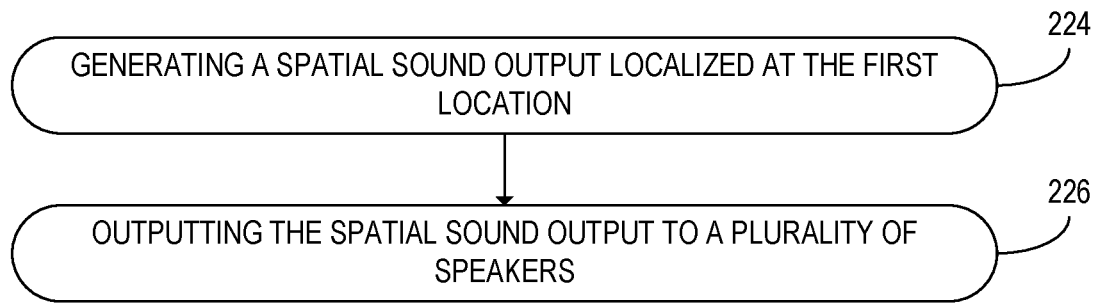

As shown in FIG. 8D, the method 200 may further include, at step 224, generating a spatial sound output localized at the first location. The method 200 may further include, at step 226, outputting the spatial sound output to a plurality of speakers. The plurality of speakers may be on-board speakers included in the head-mounted display device or may alternatively be off-board speakers.

Figure 8E:
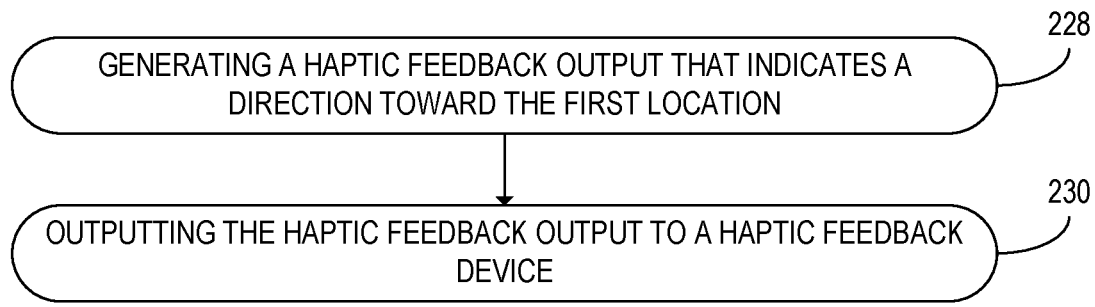

As shown in FIG. 8E, the method 200 may further include, at step 228, generating a haptic feedback output that indicates a direction toward the first location. At step 230, the method 200 may further include outputting the haptic feedback output to a haptic feedback device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
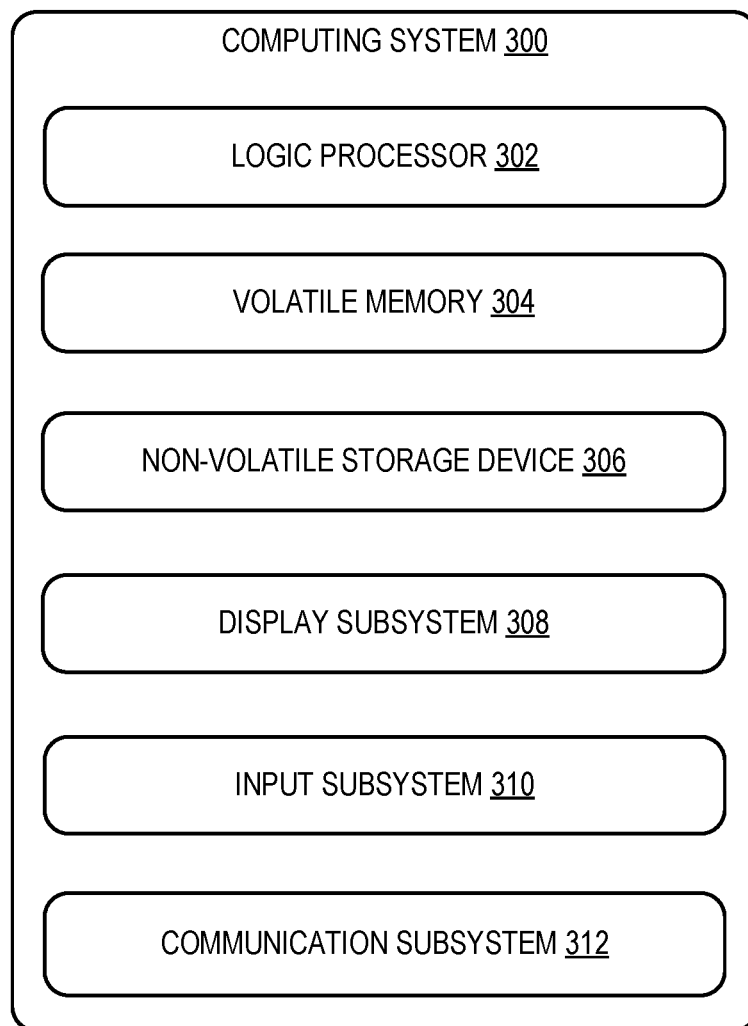
FIG. 9 shows a schematic representation of an example computing system, according to one embodiment of the present disclosure.

FIG. 9 schematically shows a non-limiting embodiment of a computing system 300 that can enact one or more of the methods and processes described above. Computing system 300 is shown in simplified form. Computing system 300 may, for example, embody the head-mounted display device 10 of FIG. 1, or may instead embody some other computing system. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 302 may include one or more physical processors (hardware) configured to execute software instructions. Additionally or alternatively, the logic processor 302 may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor 302 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 300 implemented to perform a particular function. In some cases, a program may be instantiated via logic processor 302 executing instructions held by non-volatile storage device 306, using portions of volatile memory 304. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 308 may be used to present a visual representation of data held by non-volatile storage device 306. As the herein described methods and processes change the data held by the non-volatile storage device 306, and thus transform the state of the non-volatile storage device 306, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem 310 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 312 may be configured to communicatively couple computing system 300 with one or more other computing devices. Communication subsystem 312 may include wired and/or wireless communication devices compatible with one or more different communication protocols. As non-limiting examples, the communication subsystem 312 may be configured for communication via a wireless telephone network, or a wired or wireless local- or wide-area network. In some embodiments, the communication subsystem 312 may allow computing system 300 to send and/or receive messages to and/or from other devices via a network such as the Internet.

According to one aspect of the present disclosure, a head-mounted display system is provided. The head-mounted display system may include a head-mounted display configured to display one or more virtual objects in a physical environment. The one or more virtual objects may include an application program virtual object associated with an application program and displayed at a first location in the physical environment. The head-mounted display system may further include a processor configured to receive a three-dimensional push notification at the application program via an application program interface (API) of one or more APIs included in a volumetric operating system. The processor may be further configured to generate a three-dimensional push notification virtual object based on the three-dimensional push notification. The processor may be further configured to output the three-dimensional push notification virtual object for display on the head-mounted display at a second location relative to the first location in the physical environment.

According to this aspect, the second location may be a world-locked location in the physical environment.

According to this aspect, at least one of the first location and the second location may be an anchor location world-locked to a surface of a physical object in the physical environment.

According to this aspect, the head-mounted display system may further include at least one input device. The processor may be further configured to receive an interaction input via the at least one input device. The processor may be further configured to generate at least one additional virtual object based on the interaction input and output the at least one additional virtual object for display on the head-mounted display.

According to this aspect, the application program virtual object may occupy a first volume of space in the physical environment. The interaction input may include an interaction with the application program virtual object within the first volume of space.

According to this aspect, the three-dimensional push notification virtual object may occupy a second volume of space in the physical environment. The interaction input may include an interaction with the three-dimensional push notification virtual object within the second volume of space.

According to this aspect, the head-mounted display system may further include an inward-facing optical sensor configured to detect a gaze direction of a user. The processor may be further configured to determine a field of view of the user based on the gaze direction.

According to this aspect, the first location may be outside the detected field of view, and the second location may be inside the detected field of view.

According to this aspect, the head-mounted display system may further include a plurality of speakers. The processor may be further configured to generate a spatial sound output localized at the first location and output the spatial sound output to the plurality of speakers.

According to this aspect, the three-dimensional push notification may include three-dimensional push notification data selected from the group consisting of color data, shape data, text data, animation data, interactivity data, and location data of the three-dimensional push notification virtual object.

According to this aspect, the three-dimensional push notification virtual object may be configured to replace the application program virtual object.

According to this aspect, the three-dimensional push notification virtual object may be displayed on a surface of the application program virtual object.

According to this aspect, the three-dimensional push notification virtual object may be displayed based at least in part on a display location of the head-mounted display in the physical environment.

According to this aspect, the three-dimensional push notification virtual object may be displayed along a direction from the display location to the first location.

According to another aspect of the present disclosure, a method for use with a head-mounted display system is provided. The method may include executing an application program in a volumetric operating system. Executing the application program may include outputting an application program virtual object for display on a head-mounted display at a first location in a physical environment. The method may further include receiving a three-dimensional push notification at the application program via an application program interface (API) of one or more APIs included in the volumetric operating system. The method may further include generating a three-dimensional push notification virtual object based on the three-dimensional push notification. The method may further include outputting the three-dimensional push notification virtual object for display on the head-mounted display at a second location relative to the first location in the physical environment.

According to this aspect, the second location may be a world-locked location in the physical environment.

According to this aspect, the method may further include receiving an interaction input via at least one input device. The method may further include generating at least one additional virtual object based on the interaction input. The method may further include outputting the at least one additional virtual object for display on the head-mounted display.

According to this aspect, the three-dimensional push notification may include three-dimensional push notification data selected from the group consisting of color data, shape data, text data, animation data, interactivity data, and location data of the three-dimensional push notification virtual object.

According to this aspect, the three-dimensional push notification virtual object may be generated based at least in part on a display location of the head-mounted display in the physical environment.

According to another aspect of the present disclosure, a head-mounted display system is provided, including a head-mounted display configured to display one or more virtual objects in a physical environment. The head-mounted display system may further include a processor configured to receive a three-dimensional push notification at an application program via an application program interface (API) of one or more APIs included in a volumetric operating system. The three-dimensional push notification may indicate a first location in the physical environment of an application program virtual object included in the one or more virtual objects. The application program virtual object may be associated with the application program. The application program virtual object may occupy a first volume of space in the physical environment. The processor may be further configured to generate a three-dimensional push notification virtual object based on the three-dimensional push notification. The processor may be further configured to output the three-dimensional push notification virtual object for display on the head-mounted display at a second location relative to the first location in the physical environment. The three-dimensional push notification virtual object may occupy a second volume of space in the physical environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display system, comprising:
a head-mounted display configured to display one or more virtual objects in a physical environment, the one or more virtual objects including an application program virtual object associated with an application program and displayed at a first location in the physical environment, wherein the application program virtual object is displayed to occupy a first volume of space in the physical environment;
at least one input device; and
a processor configured to:
receive a three-dimensional push notification at the application program via an application program interface (API) of one or more APIs included in a volumetric operating system, the three-dimensional push notification including location data indicating a second location relative to the first location in the physical environment;
determine whether a three-dimensional push notification virtual object is to be displayed inside or outside a field of view of a user;
generate the three-dimensional push notification virtual object based on the three-dimensional push notification;
responsive to determining that the three-dimensional push notification virtual object is to be displayed inside the field of view, output the three-dimensional push notification virtual object for display on the head-mounted display at the second location, wherein the three-dimensional push notification virtual object is displayed to occupy a second volume of space in the physical environment;
responsive to determining that the three-dimensional push notification virtual object is to be displayed outside the field of view, output an indication of a direction toward the second location; and
receive an interaction input via the at least one input device, wherein the interaction input includes an interaction with the three-dimensional push notification virtual object within the second volume of space.

2. The head-mounted display system of claim 1, wherein the second location is a world-locked location in the physical environment.

3. The head-mounted display system of claim 2, wherein at least one of the first location and the second location is an anchor location world-locked to a surface of a physical object in the physical environment.

4. The head-mounted display system of claim 1, wherein the processor is further configured to:
generate at least one additional virtual object based on the interaction input; and
output the at least one additional virtual object for display on the head-mounted display.

5. The head-mounted display system of claim 4, wherein the interaction input includes an interaction with the application program virtual object within the first volume of space.

6. The head-mounted display system of claim 1, further comprising an inward-facing optical sensor configured to detect a gaze direction of a user, wherein:
the processor is further configured to determine the field of view of the user based on the gaze direction.

7. The head-mounted display system of claim 1, further comprising a plurality of speakers, wherein the processor is further configured to:
generate a spatial sound output localized at the first location; and
output the spatial sound output to the plurality of speakers.

8. The head-mounted display system of claim 1, wherein the three-dimensional push notification includes three-dimensional push notification data selected from the group consisting of color data, shape data, text data, animation data, interactivity data, and location data of the three-dimensional push notification virtual object.

9. The head-mounted display system of claim 1, wherein the three-dimensional push notification virtual object is configured to replace the application program virtual object.

10. The head-mounted display system of claim 1, wherein the three-dimensional push notification virtual object is displayed on a surface of the application program virtual object.

11. The head-mounted display system of claim 1, wherein the three-dimensional push notification virtual object is displayed based at least in part on a display location of the head-mounted display in the physical environment.

12. The head-mounted display system of claim 11, wherein the three-dimensional push notification virtual object is displayed along a direction from the display location to the first location.

13. The head-mounted display system of claim 1, further comprising a haptic feedback device, wherein the processor is further configured to:
generate a haptic feedback output indicating a direction toward the first location; and
output the haptic feedback to the haptic feedback device.

14. The head-mounted display system of claim 1, wherein the indication of the direction toward the second location includes one or more of a visual indicator, a spatial sound output, and a haptic feedback output.

15. A method for use with a head-mounted display system, the method comprising:
executing an application program in a volumetric operating system, wherein executing the application program includes outputting an application program virtual object for display on a head-mounted display at a first location in a physical environment, wherein the application program virtual object is displayed to occupy a first volume of space in the physical environment;
receiving a three-dimensional push notification at the application program via an application program interface (API) of one or more APIs included in the volumetric operating system, the three-dimensional push notification including location data indicating a second location relative to the first location in the physical environment;
determining whether a three-dimensional push notification virtual object is to be displayed inside or outside a field of view of a user;

generating the three-dimensional push notification virtual object based on the three-dimensional push notification; and responsive to determining that the three-dimensional push notification virtual object is to be displayed inside the field of view, outputting the three-dimensional push notification virtual object for display on the head-mounted display at the second location, wherein the three-dimensional push notification virtual object is displayed to occupy a second volume of space in the physical environment;

responsive to determining that the three-dimensional push notification virtual object is to be displayed outside the field of view, outputting an indication of a direction toward the second location; and receiving an interaction input via at least one input device, wherein the interaction input includes an interaction with the three-dimensional push notification virtual object within the second volume of space.

16. The method of claim 15, wherein the second location is a world-locked location in the physical environment.

17. The method of claim 15, further comprising:
generating at least one additional virtual object based on the interaction input; and
outputting the at least one additional virtual object for display on the head-mounted display.

18. The method of claim 15, wherein the three-dimensional push notification includes three-dimensional push notification data selected from the group consisting of color data, shape data, text data, animation data, interactivity data, and location data of the three-dimensional push notification virtual object.

19. The method of claim 15, wherein the three-dimensional push notification virtual object is generated based at least in part on a display location of the head-mounted display in the physical environment.

20. A head-mounted display system, comprising:
a head-mounted display configured to display one or more virtual objects in a physical environment;
at least one input device; and
a processor configured to:

receive a three-dimensional push notification at an application program via an application program interface (API) of one or more APIs included in a volumetric operating system, wherein:
the three-dimensional push notification indicates a first location in the physical environment of an application program virtual object included in the one or more virtual objects, wherein the application program virtual object is displayed to occupy a first volume of space in the physical environment;
the application program virtual object is associated with the application program; and
the three-dimensional push notification indicates a second location relative to the first location in the physical environment;
determine whether a three-dimensional push notification virtual object is to be displayed inside or outside a field of view of a user;
generate the three-dimensional push notification virtual object based on the three-dimensional push notification;
responsive to determining that the three-dimensional push notification virtual object is to be displayed inside the field of view, output the three-dimensional push notification virtual object for display on the head-mounted display at the second location, wherein the three-dimensional push notification virtual object occupies a second volume of space in the physical environment; and
responsive to determining that the three-dimensional push notification virtual object is to be displayed outside the field of view, output an indication of a direction toward the second location;
receive an interaction input via the at least one input device, wherein the interaction input includes an interaction with the three-dimensional push notification virtual object within the second volume of space.

* * * * *